United States Patent [19]

Zumbusch

[11] Patent Number: 5,145,348
[45] Date of Patent: Sep. 8, 1992

[54] GEROTOR PUMP HAVING AN IMPROVED DRIVE MECHANISM

[75] Inventor: Steven J. Zumbusch, Eden Prairie, Minn.

[73] Assignee: Eaton Corporation, Cleveland, Ohio

[21] Appl. No.: 700,295

[22] Filed: May 15, 1991

[51] Int. Cl.$^5$ .............................. F04C 15/02
[52] U.S. Cl. ........................... 418/171; 418/182; 464/102
[58] Field of Search ............... 418/182, 171; 417/366, 417/410; 464/102, 160

[56] References Cited

U.S. PATENT DOCUMENTS

| | | | |
|---|---|---|---|
| 982,895 | 1/1911 | Stoker | 418/182 |
| 1,970,146 | 8/1934 | Hill . | |
| 2,434,135 | 1/1948 | Witchger . | |
| 3,289,602 | 12/1966 | Hudgens . | |
| 3,381,498 | 5/1968 | McDermott . | |
| 3,969,044 | 7/1976 | Füssner et al. | 417/410 |
| 4,181,479 | 1/1980 | Ross | 418/61 |
| 4,231,719 | 11/1980 | Ringwald et al. | 418/410 |
| 4,619,588 | 10/1986 | Moore, III | 418/182 |
| 4,897,025 | 1/1990 | Negishi | 418/171 |
| 4,978,282 | 12/1990 | Fu et al. | 418/182 |
| 5,006,048 | 4/1991 | Jow | 418/182 |

FOREIGN PATENT DOCUMENTS 2814659  10/1979  Fed. Rep. of Germany ....... 418/182

Primary Examiner—Richard A. Bertsch
Assistant Examiner—David L. Cavanaugh
Attorney, Agent, or Firm—L. J. Kasper

[57] ABSTRACT

A gerotor pump is disclosed of the fixed-axis type, including an outer rotor (33) and an inner rotor (35). The gerotor is driven by a drive shaft (25) through a driver (51) including a pair of drive members (57), each having a cylindrical drive surface (59). The inner rotor (35) defines a pair of diametrically opposed recesses (61), each including a driven surface (63). With the drive members engaging the driven surfaces, the inner rotor is permitted to deviate from perfect concentricity with the drive shaft to the extent necessary to result in minimum torque input to drive the rotors, without binding occurring between the rotors, as typically occurs if the inner rotor is forced to remain concentric with the drive shaft.

9 Claims, 3 Drawing Sheets

GEROTOR PUMP HAVING AN IMPROVED DRIVE MECHANISM

BACKGROUND OF THE DISCLOSURE

The present invention relates to gerotor devices, such as pumps and motors, and more particularly, to improved drive mechanisms for use in such devices.

Although the drive mechanism of the present invention may be utilized with various types of gerotor devices, it is especially advantageous when applied to a gerotor pump of the "fixed-axis" type, and will be described in connection therewith. In a fixed-axis gerotor pump, the gerotor includes an outer rotor, which rotates about its axis of rotation, and eccentrically disposed within the outer rotor is an inner rotor which rotates about its axis of rotation. Typically, the outer rotor is rotatably disposed within a stationary housing member.

Gerotor gear pumps of the fixed-axis type have become especially popular for use in automotive fuel pumps, which are immersed in the vehicle fuel tank and pump fuel from the tank through the fuel line to the engine. A typical automotive fuel pump includes an electric motor and a gerotor gear pump, disposed in a common housing, with the electric motor driving the gear set by means of the motor output shaft.

In a gerotor fuel pump, in which the inner rotor of the gerotor gear set is driven by an electric motor, the vehicle manufacturer specifies a certain, maximum electrical amperage (current) which is available to drive the electric motor of the fuel pump. The amperage required to drive the pump is determined by the torque needed to rotate the inner rotor of the gerotor gear set.

Ideally, the torque required to turn the inner rotor of the gerotor is quite small, being a function primarily of the output pressure of the fuel being pumped. In a typical automotive fuel pump, the output pressure is in the range of about 50-80 psi. However, in actual production, the ideal may not be achieved.

There may not be perfect concentricity amongst the axes of rotation of the motor output shaft, the inner rotor of the gerotor, the outer rotor of the gerotor, and the pumping chamber in which the outer rotor is located. It has been found that in many production gerotor fuel pumps, the deviation from perfect concentricity can be as much as 0.010 to 0.020 inches.

In typical prior art gerotor fuel pumps, the drive mechanism connecting the motor output shaft to the inner rotor of the gerotor has been relatively "fixed" or "rigid", i.e., very little relative movement is permitted between the axis of rotation of the motor output shaft and the axis of rotation of the gerotor inner rotor. As will be appreciated by those skilled in the art, when there is substantial deviation from perfect concentricity in a gerotor fuel pump utilizing a relatively rigid drive connection, one result will be a tendency for "binding" between the inner and outer rotors, thus substantially increasing the torque required to drive the inner rotor, and the amperage required by the electric motor.

SUMMARY OF THE INVENTION

Accordingly, it is an object of the present invention to provide an improved gerotor pump, and an improved drive mechanism for use therein, which will substantially eliminate the above-described shortcomings of the prior art gerotor devices.

It is a more specific object of the present invention to provide an improved drive mechanism for a gerotor pump, which will accommodate less-than-perfect concentricity of the drive shaft, the pumping chamber, and the inner and outer rotors, without binding or drag occurring between the rotors, and therefore, without a substantial increase in the torque required to drive the rotors.

Among the various gerotor drive arrangements developed in the prior art, several utilize three (or more) drive members, presumably on the theory that three drive members will provide a mechanism which is inherently self-centering. See, for example, U.S. Pat. No. 4,181,479 for such a device. In the patented device, it is true that the use of the three drive balls will inherently tend to center the inner rotor relative to the shaft. However, forcing the axis of the inner rotor to be coincident with the axis of the shaft will not solve the problem of binding between the rotors, and the greater drive torque required, but instead, may actually worsen the problem by limiting the relative freedom between the inner rotor and the outer rotor.

Accordingly, it is another object of the present invention to provide an improved gerotor pump and drive mechanism therefor, which avoids the problem of the inner rotor attempting to center itself relative to the shaft, and instead, permits substantial freedom between the axis of the shaft and the axis of the inner rotor. The above and other objects of the present invention are accomplished by the provision of a device of the type including housing means defining a fluid inlet, a fluid outlet, and a pumping chamber. The pump further includes a pumping element disposed in the pumping chamber and motor means adapted to transmit drive torque to the pumping element by means of a drive shaft. The pumping element comprises an internally-toothed outer rotor having a first axis of rotation and a plurality of internal teeth, and an externally-toothed inner rotor having a second axis of rotation and a plurality of external teeth. The externally-toothed rotor is eccentrically disposed within the internally-toothed rotor to define a plurality of expanding and contracting fluid volume chambers as each of the toothed rotors rotates about its respective axis of rotation. The housing means defines passage means communicating between the fluid inlet and the expanding volume chambers and passage means communicating between the contracting volume chambers and the fluid outlet. The drive shaft defines a third axis of rotation disposed to coincide substantially with the second axis of rotation of the externally-toothed rotor.

The improved device is characterized by the drive shaft including a pair of axially-extending drive members disposed diametrically about the third axis of rotation of the drive shaft, each of the drive members including a drive surface. The externally-toothed inner rotor includes a pair of driven recesses disposed diametrically about the second axis of rotation of the externally-toothed rotor, each of the driven recesses including a driven surface. One of the drive surface and the driven surface defines a portion of a cylinder having its axis extending substantially parallel to the axes of rotation, and the other of the drive surface and the driven surface defines a flat plane being substantially coincident with one of the second and third axes of rotation.

In accordance with a more specific aspect of the present invention, the drive surface engages the driven surface, when the second and third axes of rotation substantially coincide, the flat plane being tangential to the cylindrical surface to define a line of tangency, whereby the forces applied by the drive surfaces to the driven surfaces are oriented substantially at right angles to a plane containing the second and third axes of rotation and the lines of tangency.

DESCRIPTION OF THE PREFERRED EMBODIMENTS

Figure 1:
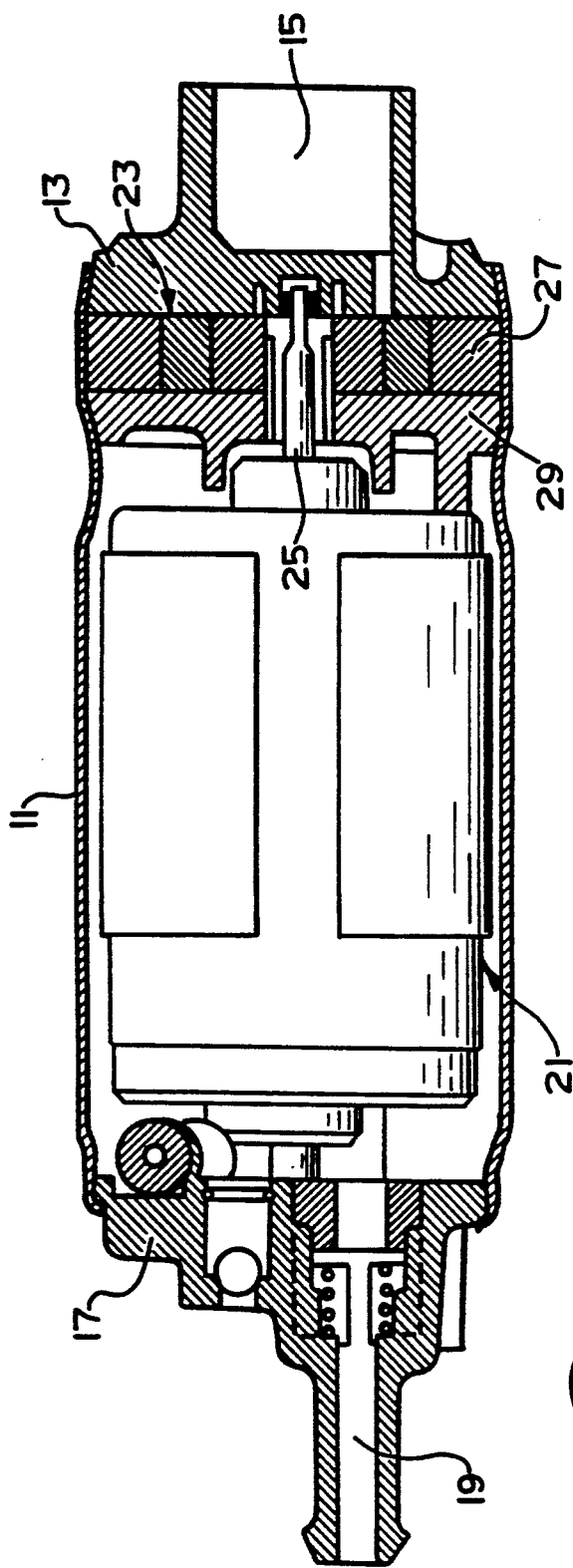
FIG. 1 is an axial cross-section of a PRIOR ART automotive fuel pump of the type with which the present invention may be utilized.

Referring now to the drawings, which are not intended to limit the invention, FIG. 1 illustrates an automotive gerotor fuel pump, although it will be understood by those skilled in the art that the invention may be applicable in any gerotor device of the fixed-axis type. The pump has a housing or shell 11 which, at its right end in FIG. 1 is crimped about the outer periphery of an inlet plate 13 which defines an inlet port 15. At its left end in FIG. 1, the housing 11 is crimped about the outer periphery of an outlet plate 17, which defines an outlet port 19.

A permanent magnet electric motor, generally designated 21, is disposed within the housing 11 and constitutes the source of drive torque for a pumping element, generally designated 23. The electric motor 21 has a drive shaft 25 extending axially therefrom for transmitting the drive torque to the pumping element 23. It will be understood that the construction of the electric motor 21 is not essential to the present invention, and therefore, a detailed description of the motor 21 has been omitted hereinafter. It should further be understood that, for purposes of the present invention, all that is required is some sort of "motor means", i.e., a source of drive torque for the pumping element 23, if the invention if being used in a pump.

As is generally well known to those skilled in the fuel pump art, when an appropriate electrical signal is transmitted to the electric motor 21 to cause rotation thereof, fluid (typically a fuel such as gasoline, diesel fuel, etc.) is drawn into the pump through the inlet port 15, at approximately "reservoir" pressure, then pumped by the pumping element 23 axially over and around the electric motor 21, and then discharged from the outlet port 19.

Referring still to FIG. 1, disposed adjacent the inlet plate 13 is an eccentric ring member 27, and disposed adjacent the ring member 27 is a port plate 29. The ring member 27 cooperates with the inlet plate 13 and port plate 29 to define therebetween a pumping chamber 31 (see FIG. 2), with the pumping element 23 being rotatably disposed within the chamber 31. The crimp of the housing 11 is used to hold the ring member 27 in tight-sealing engagement with both the inlet plate 13 and the port plate 29.

Figure 3:
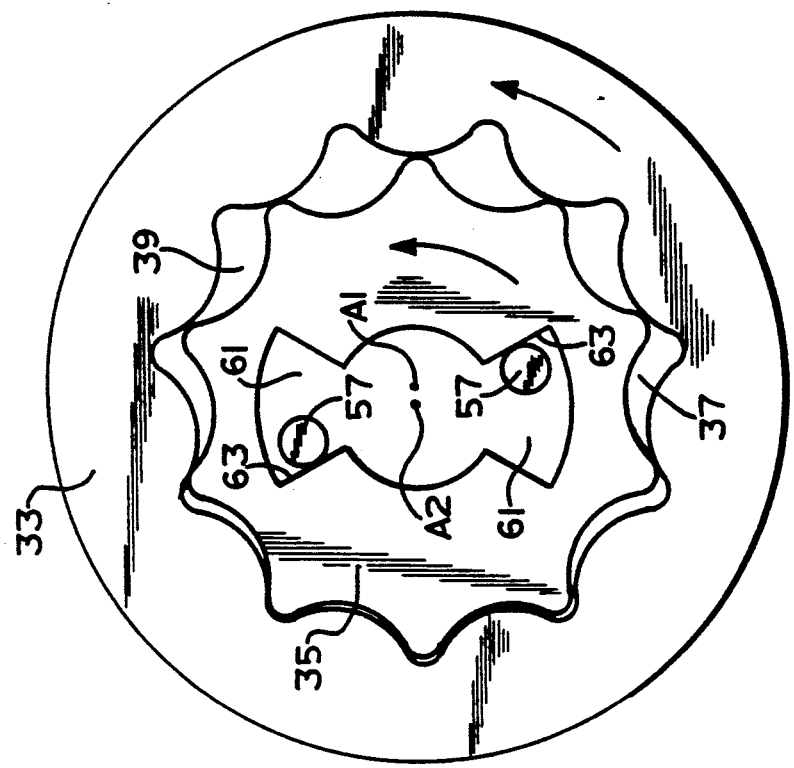
FIG. 3 is a transverse cross-section taken on line 3—3 of FIG. 2, illustrating a gerotor pump made in accordance with the present invention.
Figure 2:
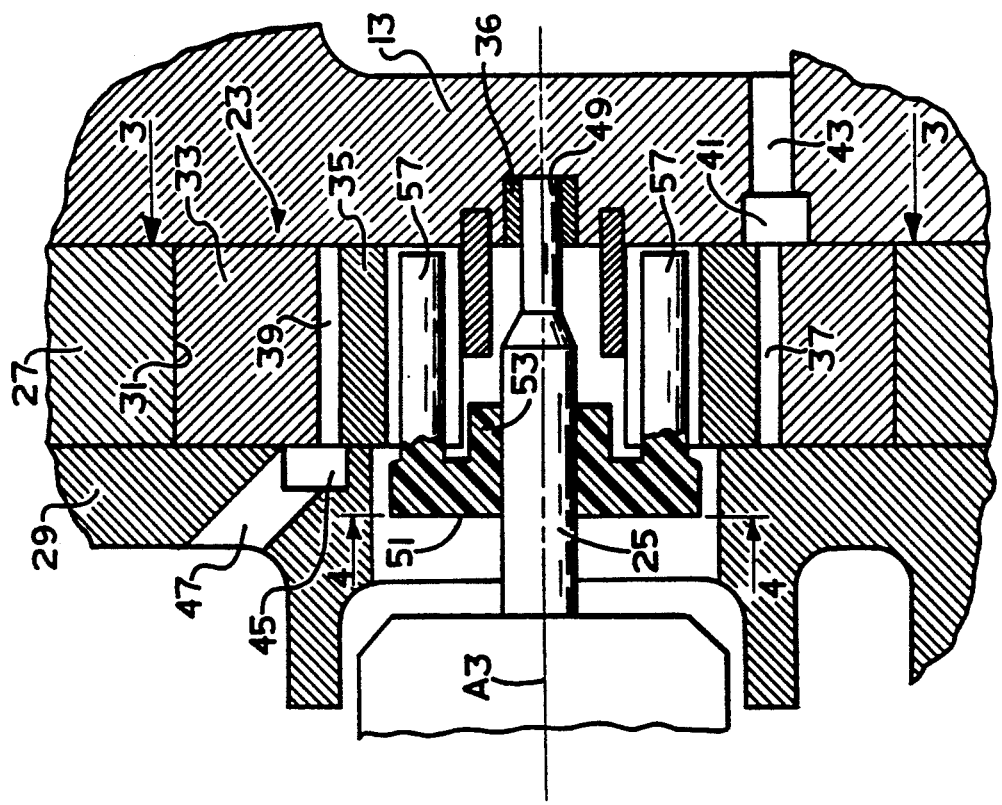
FIG. 2 is an enlarged, fragmentary axial cross-section, similar to FIG. 1, illustrating primarily the pumping element, made in accordance with the present invention.

Referring now to FIGS. 2 and 3, the pumping element 23 comprises an internally-toothed outer rotor 33, which rotates within the pumping chamber 31 about its axis of rotation A1 (see FIG. 3). Eccentrically disposed within the outer rotor 33 is an externally-toothed inner rotor 35, which rotates about its axis of rotation A2, and is rotatably supported by a rotor bearing 36. With the rotors 33 and 35 rotating about their respective axes of rotation A1 and A2, the teeth of the rotors interengage to define a plurality of expanding fluid volume chambers 37 and a plurality of contracting fluid volume chambers 39, assuming counter-clockwise direction of the rotors in FIG. 3, as indicated by the arrows.

As is generally well known to those skilled in the art, the inlet plate 13 defines a generally kidney-shaped port 41 disposed adjacent the expanding volume chambers 37. The inlet plate 13 further defines a passage 43 communicating between the inlet port 15 and the kidney port 41 adjacent the expanding volume chambers 37. Similarly, the port plate 29 defines a generally kidney-shaped port 45 disposed adjacent the contracting volume chambers 39, and a passage 47 for communicating pressurized fluid from the kidney port 45 adjacent the contracting volume chambers 39 to the region disposed between the housing 11 and the electric motor 21, through which pressurized fluid flows on its way to the outlet port 19.

Drive Mechanism

Referring still to FIGS. 2 and 3, the drive shaft 25 includes a reduced diameter portion 49, which is journalled within the inlet plate 13, whereby the drive shaft 25 is rotatably supported as it rotates about its axis of rotation A3. Disposed about the drive shaft 25 is a plastic driver 51 which is fixed to rotate with the drive shaft 25, such as by an interference fit therebetween, or a knurl, or any other suitable means. Although the driver 51 is illustrated and described herein as being molded plastic, for ease of manufacture, it should be understood that such is not an essential feature of the invention.

Figure 4:
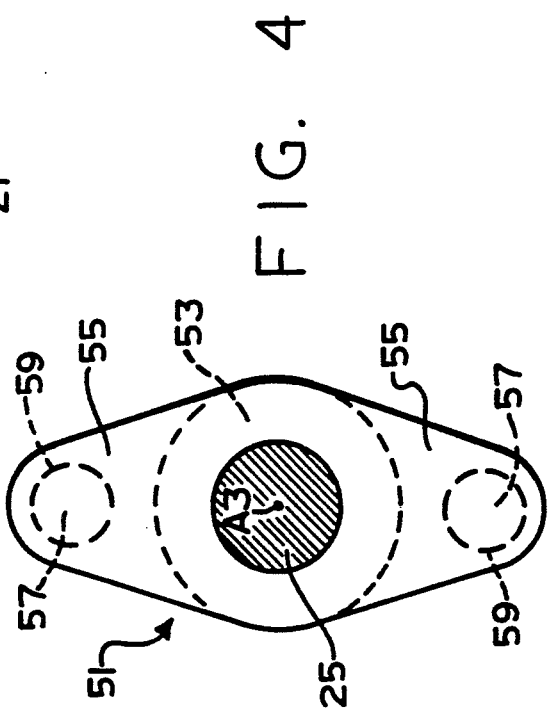
FIG. 4 is a transverse cross-section taken on line 4—4 of FIG. 2, illustrating part of the drive mechanism of the present invention.

The plastic driver 51 includes a generally cylindrical portion 53 surrounding the drive shaft 25, and molded integrally therewith, a pair of oppositely disposed tabs 55 (see FIG. 4). Each of the tabs has, molded integrally therewith, a generally cylindrical, axially extending drive member 57, each of which includes an outer cylindrical surface 59 which comprises a drive surface.

Each of the drive members 57 extends axially into a recess 61 defined by the inner rotor 35. As may best be seen in FIG. 5, each of the recesses 61 includes a radially oriented driven surface 63, such that the two driven surfaces 63 lie in a common plane passing through the axis of rotation A2 of the inner rotor 35.

It is an essential element of the present invention that there be two of the drive members 57 and two of the driven surfaces 63, and that the drive members 57 be disposed diametrically about the axis of rotation A3 of the drive shaft 25, while the driven surfaces 63 be disposed diametrically about the axis of rotation A2 of the inner rotor.

Figure 5:
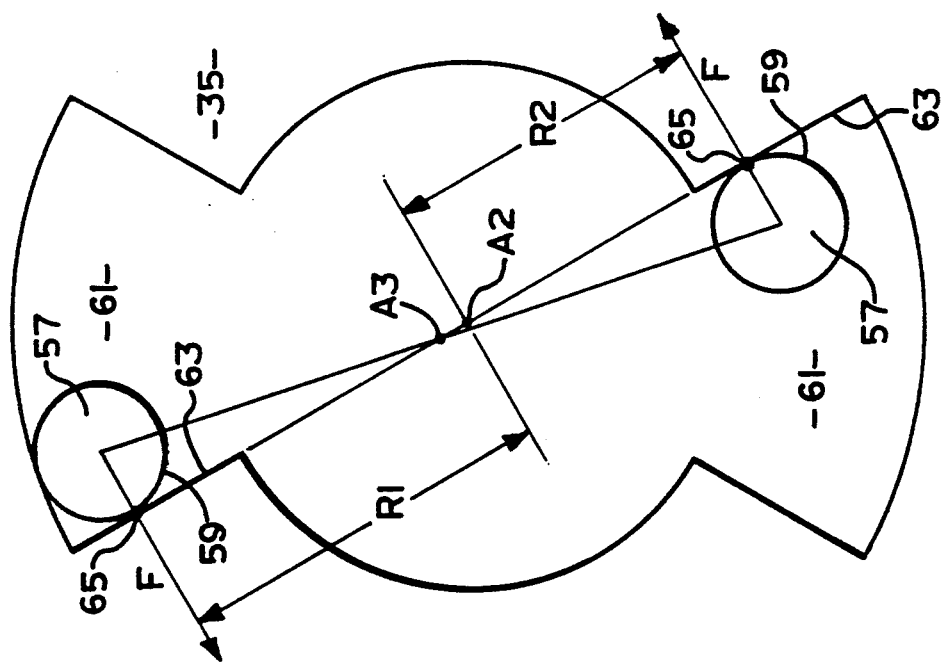
FIG. 5 is a further enlarged, somewhat schematic view, similar to FIG. 3, showing primarily the drive mechanism and the various dimensions involved.

Referring still to FIG. 5, one important aspect of the present invention shall now be described in greater detail. As was mentioned in the Background of the Disclosure, various prior art gerotor drive mechanisms have involved the use of three or more drive members, such that the inner rotor tends to be centered relative to the drive shaft. As a result of the use of only two drive members 57 in the present invention, the inner rotor 35 is not forced to be centered relative to (coaxial with) the drive shaft 25, but instead, is free to rotate about its axis of rotation A2 which is free to move relative to the axis of rotation A1 of the outer rotor 33, such that the minimum possible torque is required to rotate the rotors 33 and 35. As may best be seen in FIG. 5, the drive mechanism of the present invention permits continued rotational drive of the inner rotor 35, requiring only the minimum torque (and electrical current to the motor 21) even if there is lack of concentricity between the inner rotor 35 and the drive shaft 25. In FIG. 5, the axis of rotation A2 of the inner rotor 35 and the axis of rotation A3 of the drive shaft 25 are offset (exaggerated in FIG. 5 for purposes of illustration). The result is that the drive surface 59 on the upper drive member 57 is applying a force F to the driven surface 63 along a line of tangency 65 (shown as only a point in FIG. 5), where the driven surface 63 is tangent to the drive surface 59. The force F is applied at a radius R1 from the axis of rotation A2 of the inner rotor 35. Similarly, the drive surface 59 of the lower drive member 57 engages the driven surface 63 along a line of tangency 65, and the force F applied to the lower driven surface 63 is disposed at a radius R2 from the axis of rotation A2 of the inner rotor 35. The radius R2 is substantially less than the radius R1, because of the misalignment of the drive shaft 25, relative to the inner rotor 35. However, the force F applied at the radius R1 plus the force F applied at the radius R2 still supplies substantially the same torque being transmitted from the drive shaft 25 to the inner rotor 35 as would be transmitted if the rotor 35 and the drive shaft 25 were perfectly concentric or coaxial.

In accordance with another aspect of the present invention, it should be noted that the force F applied by the upper drive member 57 is substantially perpendicular to the driven surface 63, as is the force F applied by the lower drive member to its respective driven surface 63. With the driven surfaces 63 lying in a common plane which passes through and contains the axis of rotation A2 of the inner rotor 35, the forces F result in pure rotational motion of the inner rotor 35, i.e., there is no force vector acting in a radial direction, either radially inward or radially outward. The absence of radial force vectors is important because it is the occurrence of such radial forces in prior art drive mechanisms which has been partly responsible for the tendency of the inner and outer rotors to bind during rotation, thus substantially increasing the torque required to drive the rotors, as well as the electrical current required by the motor 21.

Figure 6:
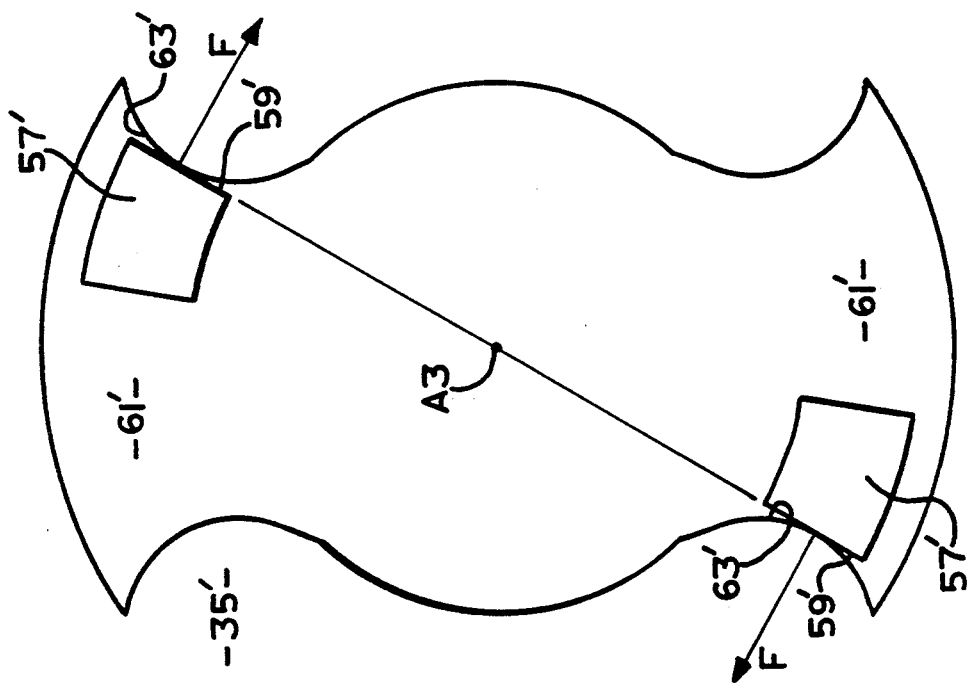
FIG. 6 is a view similar to FIG. 5 illustrating an alternative embodiment of the present invention.

FIG. 6 - Alternative Embodiment

Referring now to FIG. 6, there is illustrated an alternative embodiment of the present invention in which like elements bear like numerals, accompanied by a prime mark. In FIG. 6, the inner rotor 35' defines a pair of recesses 61', each of which includes a curvilinear driven surface 63'. The driver includes a pair of drive members 57', each of which defines a drive surface 59'. The two drive surfaces 59' lie in a common plane which passes through the axis of rotation A3 of the drive shaft. In the embodiment of FIG. 6, the drive shaft and the inner rotor 35' are illustrated as being coaxial, such that the axis of rotation A3 coincides with the axis of rotation A2 of the inner rotor 35'.

It should be noted that in both the FIG. 5 and FIG. 6 embodiments, the recesses 61 and 61' are shown as being substantially symmetrical about a vertical plane, thus permitting rotation in the opposite direction of the drive shaft 25, or installation of the inner rotor in a position reversed from that shown, i.e., rotated 180° about a vertical axis.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A pump of the type including housing means defining a fluid inlet, a fluid outlet, and a pumping chamber; said pump further including a pumping element disposed in said pumping chamber and motor means adapted to transmit drive torque to said pumping element by means of a drive shaft; said pumping element comprising an internally-toothed rotor having a first axis of rotation and a plurality of internal teeth, and an externally-toothed rotor having a second axis of rotation and a plurality of external teeth, said externally-toothed rotor being eccentrically disposed within said internally-toothed rotor to define a plurality of expanding and contracting fluid volume chambers as each of said internally-and externally-toothed rotors rotates about its respective axis of rotation; said housing means defining a passage means communicating between said fluid inlet and said expanding fluid volume chambers and passage means communicating between said contracting fluid volume chambers and said fluid outlet; said drive shaft defining a third axis of rotation disposed to coincide substantially with said second axis of rotation of said externally-toothed rotor; characterized by:

(a) said drive shaft including a pair of axially-extending drive members disposed diametrically about said third axis of rotation of said drive shaft, each of said drive members including a drive surface;

(b) said externally-toothed rotor including a pair of driven recesses disposed diametrically about said second axis of rotation of said externally-toothed rotor, each of said driven recesses including a driven surface;

(c) one of said drive surface and said driven surface defining a portion of a cylinder having its axis extending substantially parallel to said axes of rotation, and the other of said drive surface and said driven surface defining a flat plane being substantially coincident with one of said second and third axes of rotation.

2. A pump as claimed in claim 1, characterized by said drive surface engaging said driven surface, when said second and third axes of rotation substantially coincide, said flat plane being tangential to said portion of a cylinder to define a line of tangency whereby the force applied by said drive surfaces to said driven surfaces are oriented substantially at right angles to a plane containing said second and third axes of rotation and said lines of tangency.

3. A pump as claimed in claim 1, characterized by said axially extending drive members being generally cylindrical and having their axes lying in a plane containing said third axis of rotation, and said driven surfaces defining a plane containing said second axis of rotation.

4. A pump as claimed in claim 1, characterized by said axially-extending drive members defining flat, planar drive surfaces, said drive surfaces lying in a common plane containing said third axis of rotation, and said driven surfaces defining said portions of a cylinder, each of said flat, planar drive surfaces remaining tangent to one of said cylindrical driven surfaces, even as said second and third axes of rotation deviate from desired coincidence.

5. A pump or motor of the type including housing means defining a fluid inlet, a fluid outlet, and a gear set chamber; said pump or motor further including a gear set disposed in said gear set chamber and input-output means adapted to transmit drive torque to or from said gear set by means of a drive shaft; said gear set comprising an internally-toothed motor having a first axis of rotation and a plurality of internal teeth, and an externally-toothed rotor having a second axis of rotation and a plurality of external teeth, said externally-toothed rotor being eccentrically disposed within said internally-toothed rotor to define a plurality of expanding and contracting fluid volume chambers as each of said internally- and externally-toothed rotors rotates about its respective axis of rotation; said housing means defining a passage means communicating between said fluid inlet and said expanding fluid volume chambers and passage means communicating between said contracting fluid volume chambers and said fluid outlet; said drive shaft defining a third axis of rotation disposed to coincide substantially with said second axis of rotation of said externally-toothed rotor; characterized by:

(a) said drive shaft including a pair of axially-extending members disposed diametrically about said third axis of rotation of said drive shaft, each of said members including a member surface;

(b) said externally-toothed rotor including a pair of recesses disposed diametrically about said second axis of rotation of said externally-toothed rotor, each of said recesses including a recess surface;

(c) one of said member surface and said recess surface defining a portion of a cylinder having its axis extending substantially parallel to said axes of rotation, and the other of said member surface and said recess surface defining a flat plane being substantially coincident with one of said second and third axes of rotation.

6. A pump or motor as claimed in claim 5, characterized by said member surface engaging said recess surface, when said second and third axes of rotation substantially coincide, said flat plane being tangential to said portion of a cylinder to define a line of tangency whereby the force F applied by one of said member surface and said recess surface to the other of said member surface and said recess surface are oriented substantially at right angles to a plane containing said second and third axes of rotation and said lines of tangency.

7. A pump or motor as claimed in claim 5, characterized by said axially-extending members being generally cylindrical and having their axes lying in a plane containing said third axis of rotation and said recess surfaces defining a plane containing said second axis of rotation.

8. A pump or motor as claimed in claim 5, characterized by said axially-extending members defining flat, planar member surfaces, said member surfaces lying in a common plane containing said third axis of rotation, and said recess surfaces defining said portions of a cylinder, each of said flat, planar member surfaces remaining tangent to one of said recess surfaces, even as said second and third axes of rotation deviate from the desired coincidence.

9. A pump or motor as claimed in claim 5, characterized by said axially-extending members comprising drive members, and each of said member surfaces comprising a drive surface; and each of said recess surfaces comprising a driven surface.

* * * * *